(12) United States Patent
Mishimagi (10) Patent No.: US 6,769,798 B2
(45) Date of Patent: Aug. 3, 2004

(54) SIDE MIRROR COVER AND COVER LAMP TO BE USED THEREFOR

(75) Inventor: Kazuharu Mishimagi, Tokyo (JP)

(73) Assignee: E'SAM Co.,. Ltd., Tokyo (JP)

( * ) Notice: Subject to any disclaimer, the term of this patent is extended or adjusted under 35 U.S.C. 154(b) by 0 days.

(21) Appl. No.: 10/187,661

(22) Filed: Jul. 1, 2002

(65) Prior Publication Data

US 2003/0193815 A1 Oct. 16, 2003

(30) Foreign Application Priority Data

Apr. 11, 2002 (JP) ........................................ 2002-109370

(51) Int. Cl.$^7$ ............................................... F21V 5/00
(52) U.S. Cl. ...................... 362/522; 362/494; 362/511; 362/548
(58) Field of Search ................................ 362/494, 511, 362/522, 548, 498

(56) References Cited

U.S. PATENT DOCUMENTS 6,264,353 B1 * 7/2001 Caraher et al. ............. 362/494
6,299,334 B1 * 10/2001 Schwanz et al. ............ 362/511

* cited by examiner

Primary Examiner—Alan Cariaso
Assistant Examiner—Guiyoung Lee
(74) Attorney, Agent, or Firm—Reed Smith LLP (57) ABSTRACT

A side mirror cover for allowing flickering or illumination of lamps to be visible from relatively a wide range is provided. The side mirror cover has a mirror cover body and a cover lamp. The lamp has a lamp housing having plural light emitting elements and a translucent lamp cover for covering the elements. The housing has a curved first corner section for closing up a part of the through hole and a first principal portion for closing up the remainder thereof. The lamp cover has a second corner section facing the first corner section and a second principal portion facing the first principal portion. The light emitting elements include first LEDs and second LEDs for emitting light toward the front and the side of the vehicle, respectively. The inner surface of the lamp cover has a projected portion facing the second LED, and the inner surface of the second corner section has concavities and convexities for reflecting light.

18 Claims, 5 Drawing Sheets

SIDE MIRROR COVER AND COVER LAMP TO BE USED THEREFOR

BACKGROUND OF THE INVENTION

This application claims the priority of Japanese Application No. 2002-109370 filed on Apr. 11, 2002.

1. Field of the Invention

The present invention relates to a side mirror cover for covering a side mirror body provided projectingly from the side of the vehicle, and a cover lamp to be used for this cover.

2. Description of the Related Art

Heretofore, a vehicle is provided with sideways projecting side mirrors on both sides of the vehicle body as well as a room mirror provided in the interior of the car for a driver to look behind for traffic. These mirrors ensure that the driver has a clear view to the rear of the vehicle without turning his/her head toward the rear. Although the room mirror and the side mirror are standardized according to the type of vehicle, the side mirror being partly responsible for the appearance of vehicle are figured to satisfy the sense of beauty. The side mirrors for passenger vehicles are mainly mounted on the doors, and figured to satisfy the sense of beauty considering the total appearance of vehicle. Further, there is a need for ornate side mirrors depending on the taste of consumers because of recent diversification of the taste of the consumers.

At the front end of the vehicle, there are provided front position lights for allowing oncoming cars and the third parties walking on the street to recognize the width of the vehicle at night as well as direction indicator lamps for indicating the turning directions of the vehicle and headlamps as an illuminating device for nigh drive. The oncoming cars and the third parties walking on the street can recognize the width of the vehicle from the front position lights and the turning direction of the vehicle from flickering of the direction indicator lamp. The oncoming cars and the third parties walking on the street ensure the safety by driving or walking while avoiding contact with the vehicle.

On the other hand, since the front position lights in the related art are provided at the front end of the vehicle, there is a problem in that the width of the vehicle body at the front end of the vehicle can be recognized, but the width of the entire vehicle including the side mirrors cannot be recognized. In other words, since the sideways projecting side mirrors are provided on the vehicle body, the width of the entire vehicle including the side mirrors is larger than the width indicated by the front position lights. Therefore, the oncoming cars or the third parties walking on the street are required to estimate the width of the entire vehicle by adding the estimated amount of projection of the side mirrors to the width indicated by the front position lights. However, since the amount of projection differs depending on the type of vehicle, it is relatively difficult to estimate. Especially, such estimation is difficult in the case of vehicles having side mirrors that project sideways significantly from the vehicle body such as heavy-duty trucks.

In order to solve these problems, a side mirror cover including a mirror cover body adapted to be capable of being mounted on the front surface of the side mirror body of the vehicle and a cover lamp mounted on the mirror cover body so as to be visible from the front of the vehicle is proposed (Japanese Patent No. 3030021). Since such side mirror covers are adapted to be attached independently on the front surface of the side mirror body, and thus the covers can be formed into complex configurations, or colored or plated in themselves, high value-added side mirror covers are obtained at a lower cost than the case of forming or processing the entire side mirror into such configurations. Furthermore, when the cover lamps mounted on the mirror cover bodies are illuminated, the positions of the side mirrors are visible from the front, and thus the width of the entire vehicle including the side mirrors can be recognized.

However, considering a case in which the cover lamp mounted on the mirror cover body is used as a direction indicator lamp, it is preferable that flickering of the cover lamp is recognized not only by the oncoming cars, but also the third parties walking by the side of the vehicle. In this case, it is conceivable to provide a separate side lamp at the laterally outer end portion of the mirror cover body (U.S. Pat. No. 5,499,169). However, there are such disadvantages that the appearance is deteriorated because the number of lamps to be mounted increases, and that the unit cost is increased due to increase in manufacturing cost and in number of components.

SUMMARY OF THE INVENTION

Accordingly, it is an object of the present invention to provide a relatively less expensive side mirror cover in which flickering or illumination of a cover lamp is visible also from the side of the vehicle, and a lamp to be used therefor.

It is another object of the invention to provide a side mirror cover in which flickering or illumination of a cover lamp is effectively visible from a wide range including the backside of the vehicle, and a lamp to be used therefor.

It is still another object of the invention to provide a side mirror cover that can be mounted on the mirror cover body in a relatively simple process, and a lamp to be used therefor.

Figure 1:
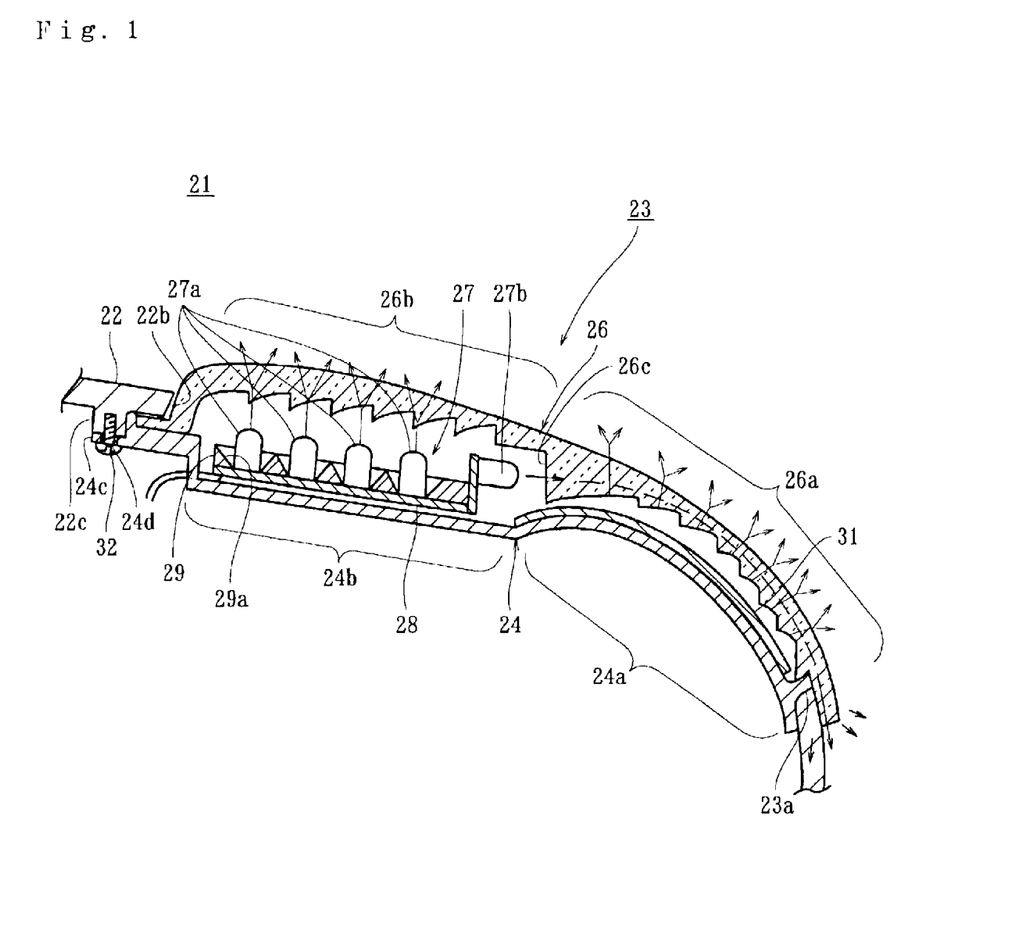
FIG. 1 is a cross sectional view of a side mirror cover of the invention taken along the line B—B in FIG. 3.
Figure 3:
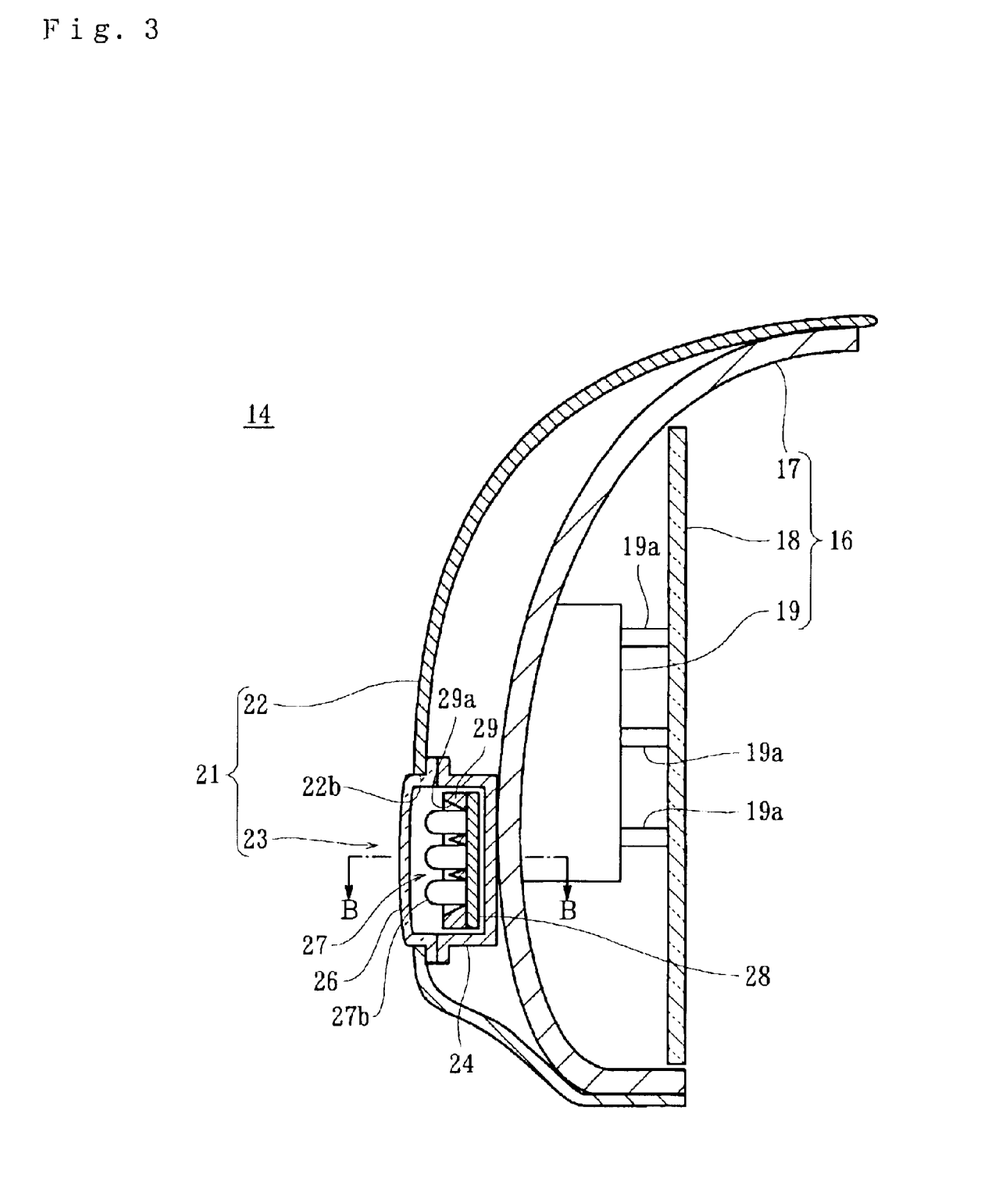
FIG. 3 is a cross sectional view of a vehicle side mirror with the cover mounted on a side mirror body, taken along the line A—A in FIG. 4.
Figure 4:
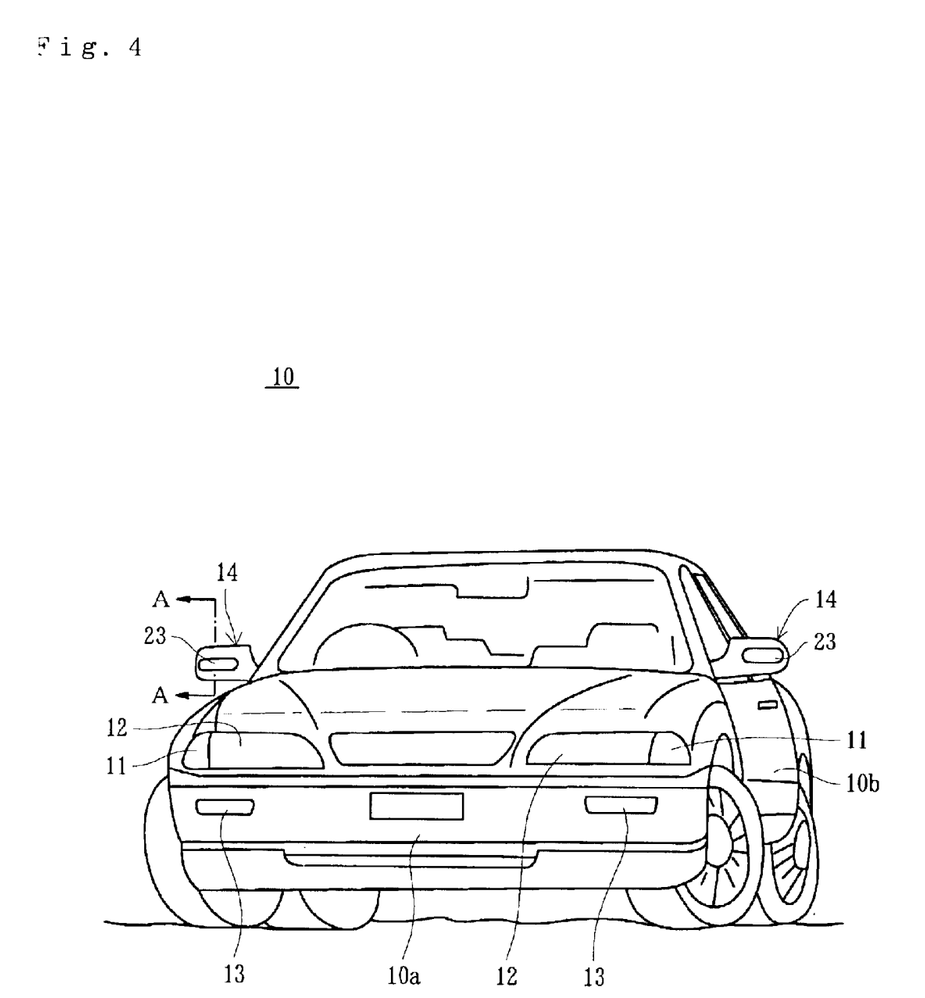
FIG. 4 is a front view of a vehicle on which the vehicle side mirror is mounted.

As shown in FIGS. 1, 3, and 4, the first aspect of the invention is an improved side mirror cover comprising a mirror cover body 22 for covering the front surface of a side mirror body 16 of a vehicle 10, curved out toward the front of the vehicle 10, and formed with a thorough hole 22b having the outer end at the position corresponding to the widthwise extremity of the vehicle 10, and a cover lamp 23 fitted from the backside of the mirror cover body 22 into the through hole 22b.

The characteristic construction of the side mirror cover is that the cover lamp 23 includes a lamp housing 24 mounted on the mirror cover body 22 along the peripheral edge of the through hole 22b formed on the mirror cover body 22 so as to close up the through hole 22b and provided with a plurality of light emitting elements 27, and a translucent lamp cover 26 mounted on either one or both of the lamp housing 24 and the mirror cover body 22 so as to cover the plurality of light emitting elements 27, in that the lamp housing 24 includes a curved first corner section 24a for closing up mainly the portion of the through hole 22b corresponding to the widthwise extremity of the vehicle 10 and a first principal portion 24b continuing from the first corner section 24a for closing up the remainder of the through hole 22b, in that the lamp cover 26 includes a second corner section 26a opposing to the first corner section 24a and a second principal position 26b continuing from the second corner section 26a and opposing to the first principal portion 24b, and in that the plurality of light emitting elements 27 include one or more first LED or LEDs 27a provided on the first principal portion 24b for emitting light toward the front of the vehicle 10, and one or more second LED or LEDs 27b for emitting light toward the side of the vehicle 10.

The second aspect of the invention is an improved cover lamp 23 to be fitted from the backside of the mirror cover body 22 into a through hole 22b of the mirror cover body 22 for covering the front surface of a side mirror body 16 on the vehicle 10, curved out toward the front of the vehicle 10, and formed with the thorough hole 22b having the outer end at the position corresponding to the widthwise extremity of the vehicle 10 from the backside of the mirror cover body 22.

The characteristic construction of the cover lamp 23 is that the cover lamp comprises a lamp housing 24 mounted on the mirror cover body 22 along the peripheral edge of the through hole 22b so as to close up the through hole 22b and provided with a plurality of light emitting elements 27 and a translucent lamp cover 26 adhered on the lamp housing 24 so as to cover the plurality of light emitting elements 27, in that the lamp housing 24 includes a curved first corner section 24a for closing up mainly the portion of the through hole 22b corresponding to the widthwise extremity of the vehicle 10 and a first principal portion 24b continuing from the first corner section 24a for closing up the remainder of the through hole 22b, in that the lamp cover 26 includes a second corner section 26a opposing to the first corner section 24a and a second principal position 26b continuing from the second corner section 26a and opposing to the first principal portion 24b, and in that the plurality of light emitting elements 27 include one or more first LED or LEDs 27a provided on the first principal portion 24b for emitting light toward the front of the vehicle 10 and one or more second LED or LEDs 27b for emitting light toward the side of the vehicle 10.

With the side mirror cover according to the first aspect of the invention and the cover lamp according to the second aspect of the invention, light emitted from the one or more first LED or LEDs 27a for emitting light toward the front of the vehicle 10 is directed toward the front of the vehicle through the second principal portion 26b of the lamp cover 26, and light emitted from the one or more second LED or LEDs 27b for emitting light toward the side of the vehicle 10 is directed toward the front and the side of the vehicle 10 through the second corner section 26a of the lamp cover 26. Consequently, light is visible from the side of the vehicle.

In a preferred arrangement of the side mirror cover according to the invention, the second LED 27b is provided on the first principal portion 24b on the far side from the vehicle 10, a projected portion 26c is formed on the inner surface of the lamp cover 26 so as to face toward the second LED 27b, and the second corner section 26a is formed with concavities and convexities on the inner surface thereof as shown in FIG. 1, so that light from the first LED 27a passes through the second principal portion 26b and is emitted toward the front of the vehicle 10, and light from the second LED 27b passes through the projected portion 26c and the second corner section 26a toward the outer end widthwise of the vehicle 10, reflects on the concavities and convexities on the inner surface of the second corner section 26a, and is emitted from the second corner section 26a toward the front and the side of the vehicle 10 and simultaneously from the outer end of the second corner section 26a toward the backside of the vehicle 10.

In the preferred arrangement of the cover lamp 23 according to the invention, the second LED 27b is provided on the first principal portion 24b on the side of the second corner section 26a, the projected portion 26c is formed on the inner surface of the lamp cover 26 so as to face toward the second LED 27b, and the second corner section 26a is formed with the concavities and convexities on the inner surface, so that light from the first LED 27a passes through the second principal portion 26b and is emitted toward the front of the vehicle 10, and light from the second LED 27b passes from the projected portion 26c through the second corner section 26a toward the outer end widthwise of the vehicle 10, reflects on the concavities and convexities on the inner surface of the second corner section 26a, and is emitted from the second corner section 26a toward the front and the side of the vehicle 10 and simultaneously from the outer end of the second corner section 26a toward the backside of the vehicle 10.

Figure 6:
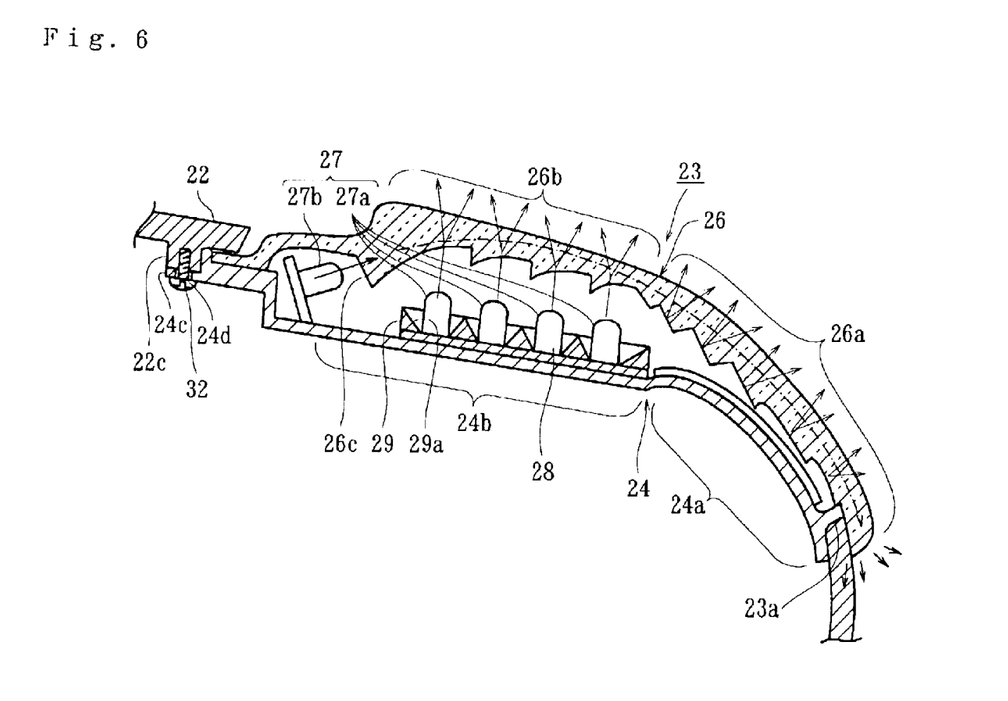
FIG. 6 is a cross sectional view corresponding to FIG. 1 showing another side mirror cover according to the invention.

In the preferred arrangement of the side mirror cover according to the invention as shown in FIG. 6, the second LED 27b is provided on the first principal portion 24b on the side closer to the vehicle 10, the projected portion 26c is formed on the inner surface of the lamp cover 26 so as to face toward the second LED 27b, and the second corner section 26a is formed with the concavities and convexities on the inner surface, so that light from the first LED 27a passes through the second principal portion 26b and is emitted toward the front of the vehicle 10, and light from the second LED 27b passed from the projected portion 26c through the second principal portion 26b and the second corner section 26a toward the outer end widthwise of the vehicle body 10, reflects on the concavities and convexities on the inner surface of the second corner section 26a, and is emitted from the second corner section 26a to the front and the side of the vehicle 10 and simultaneously from the outer end of the second corner section 26a toward the backside of the vehicle 10.

In the preferred arrangement of the cover lamp according to the invention, the second LED 27b is provided on the first principal portion 24b on the side opposite from the second corner section 26a, the projected portion 26c is formed on the inner surface of the lamp cover 26 so as to face toward the second LED 27b, and the second corner section 26a is formed with the concavities and convexities on the inner surface, so that light from the first LED 27a passed through the second principal portion 26b and is emitted toward the front of the vehicle 10, and light from the second LED 27b passes from the projected portion 26c through the second principal portion 26b and the second corner section 26a toward the outer end widthwise of the vehicle 10, reflects on the concavities and convexities on the inner surface of the second corner section 26a, and is emitted from the second corner section 26a toward the front and the side of the vehicle 10 and simultaneously from the outer end of the second corner section 26a toward the backside of the vehicle 10.

In these arrangements, since light emitted from the second LED 27b is directed not only toward the front and the side of the vehicle but also through the outer end of the second corner section 26a toward the backside of the vehicle, light is visible also from the backside of the vehicle.

In the preferred arrangement of the side mirror cover according to the invention, the plurality of light emitting elements 27 are mounted on a support 28 and accommodated in the lamp housing 24, and a first light reflector 29 is provided on the support 28 on the surface facing toward the lamp cover 26.

In the preferred arrangement of the cover lamp according to the invention, the plurality of light emitting elements 27 are mounted on the support 28 and accommodated in the lamp housing 24, and the first light reflector 29 is provided on the surface of the support 28 facing toward the lamp cover 26.

In the preferred arrangement of the side mirror cover according to the invention, a curved second light reflector 31 is provided on the first corner section 24a of the lamp housing 24.

In the preferred arrangement of the cover lamp according to the invention, the curved second light reflector 31 is mounted on the first corner section 24a of the lamp housing 24.

In these arrangements, light emitted from the light emitting element 27 reflects toward the front of the vehicle or toward the front and the side of the vehicle owing to the presence of the light reflectors 29, 31, so that the light can be effectively recognized by the oncoming cars approaching from the front toward the vehicle or by the third parties on the side of the vehicle.

In the preferred arrangement of the side mirror cover according to the invention, the cover lamp 23 is fabricated by adhering the peripheral edge of the lamp cover 26 to the peripheral edge of the lamp housing 24, is formed with a recessed groove 23a defined by the outer end portion of the first corner section 24a and the outer end portion of the second corner section 26a in the adhered state, which is capable of being fitted on the peripheral edge of the through hole 22b on the far side from the vehicle 10, and formed with a flange 24c having a mounting hole 24d at the inner end of the first principal portion 24b, the mirror cover body 22 is formed with a boss 22c at the peripheral edge of the through hole 22b on the side closer to the vehicle 10, and the cover lamp 23 is mounted on the mirror cover body 22 by fitting the recessed groove 23a onto the peripheral edge of the through hole 22b on the far side from the vehicle 10, passing a screw 32 through the mounting hole 24d and screwing it into the boss 22c.

In the preferred arrangement of the cover lamp according to the invention, the recessed groove 23a which is capable of being fitted on the peripheral edge of the through hole 22b on the far side from the vehicle 10 is defined by the outer end portion of the first corner section 24a and the outer end portion of the second corner section 26a in a state in which the peripheral edge of the lamp housing 24 and the peripheral edge of the lamp cover 26 are adhered, and the flange 24c having the mounting hole 24d is formed at the inner end portion of the first principal portion 24b.

In these arrangements, the cover lamp 23 can be mounted on the mirror cover body 22 by such a relatively simple process of fitting the recessed groove 23a on the peripheral edge of the through hole 22b on the far side from the vehicle 10, and in this state, screwing the screw 32 passed through the mounting hole 24d into the boss 22c.

DESCRIPTION OF THE PREFERRED EMBODIMENTS

Referring now to the drawings, an embodiment of the invention will be described in detail.

As shown in FIG. 4, a vehicle 10 is provided with direction indicator lamps 11, 11 for indicating the turning direction of the vehicle 10 and the head lamps 12, 12 as a illuminating device for night drive at the front end on both sides respectively, and a bumper 10a mounted below the lead lamps is provided with front position lights 13, 13 for allowing the oncoming cars and the third parties walking on the street to recognize the width of the vehicle 10 at night at both ends thereof respectively. The vehicle 10 in this embodiment is so called passenger car in the sedan category, and is adapted in such a manner that the oncoming cars and the third parties walking on the street can recognize the width of the vehicle 10 by the front position lamps 13, 13. Doors 10b on both side of the vehicle 10 are provided with sideways projecting vehicle side mirrors 14, 14 respectively thereon. These side mirrors 14, 14 are fabricated to be symmetrical and ensure that the driver has a clear view to the rear of the vehicle 10 without turning his/her head owing to these side mirrors 14, 14.

The side mirror 14 on the driver side will be described as an example. As shown in FIG. 3, the vehicle side mirror 14 comprises the side mirror body 16 and the side mirror cover 21, and the side mirror body 16 comprises a mounting member 17, a mirror plate 18, and a tilting device 19. The mirror plate 18 is mounted on the mounting member 17 with the light-reflecting surface faced toward the rear of the vehicle, so that light from the rear of the vehicle may be reflected toward the driver. The mirror plate 18 is mounted on the mounting member 17 via the tilting device 19, and the mounting member 17 is mounted at the front end of a side window on the door of the vehicle 10. The mounting member 17 is curved out at the substantially center thereof toward the front of the vehicle so as to cover the mirror plate 18, and the tilting device 19 is mounted inside the curved out mounting member 17. The tilting device 19 includes a plurality of supporting rods 19a that move in the for-and-aft direction of the vehicle by a motor (not shown) integrated therein, and the mirror plate 18 is mounted on the distal ends of the plurality of supporting rods 19a. The tilting device 19 is capable of tilting the mirror plate 18 with respect to the perpendicular direction or the direction of the width of the vehicle by moving the respective supporting rods 19a independently.

Figure 2:
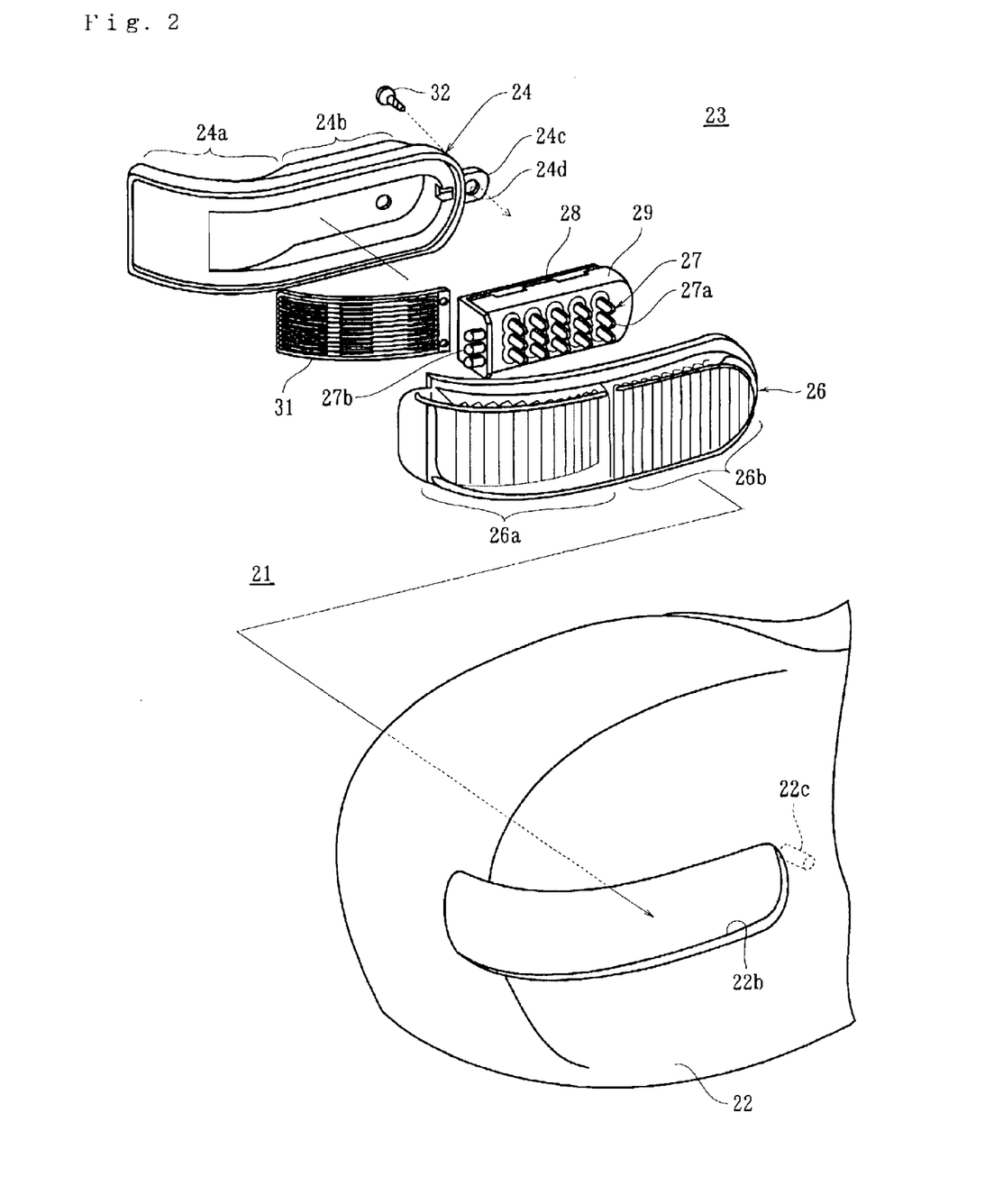
FIG. 2 is an exploded perspective view showing the side mirror cover.

The side mirror cover 21 comprises a mirror cover body 22 covering the front surface of the side mirror body 16 so as to curve out toward the front of the vehicle, and a cover lamp 23 mounted from the backside of the mirror cover body 22. The mirror cover body 22 in this embodiment is formed by molding resin, and formed to curve out toward the front of the vehicle at the substantially center thereof corresponding to the configuration of the mounting member 17 so as to cover the mounting member 17 from the front surface. The mirror cover body 22 is provided with a laterally elongated through hole 22b extending along the widthwise direction of the vehicle and having the outer end at the extremity of the mirror cove body 22 (FIG. 2). The mirror cover body 22 is adapted to be capable of being mounted on the front surface of the side mirror body 16 by applying a double-faced adhesive tape (not shown) on the inner surface thereof and then inserting the mirror cover body 22 into the mounting member 17 from the front.

As shown in FIG. 1 to FIG. 3, the cover lamp 23 is fitted from the backside of the mirror cover body 22 into the through hole 22b from the backside of the mirror cover body 22, and comprises a lamp housing 24 and a lamp cover 26. The lamp housing 24 is mounted on the mirror cover body 22 along the peripheral edge of the through hole 22b so as to close up the through hole 22b, and the lamp cover 26 is formed by molding translucent resin. The lamp housing 24 is provided with a plurality of light emitting elements 27, and the lamp cover 26 covers these plurality of light emitting elements 27 and is mounted on one or both of the lamp housing 24 and the mirror cover body 22.

As shown in FIG. 1, the lamp housing 24 comprises a curved first corner section 24a for closing up mainly the part of the through hole 22b corresponding to the widthwise extremity of the vehicle and a first principal portion 24b continuing from the first corner section 24a for closing up the remainder of the through hole 22b, and the lamp cover 26 comprises the second corner section 26a facing toward the first corner section 24a and the second principal portion 26b continuing from the second corner section 26a and facing toward the first principal portion 24b. The plurality of light emitting elements 27 are provided on the first principal portion 24b, and comprises one or more first LED or LEDs 27a provided on the first principal portion 24b for emitting light toward the front of the vehicle and one or more second LED or LEDs 27b for emitting light toward the side of the vehicle. In this embodiment, the second LED or LEDs 27b are provided on the first principal portion 24b on the far side from the vehicle.

The second principal portion 26b is formed with concavities and convexities on the inner surface thereof, so that light emitted from the first LED 27a is refracted by and passes through concavities and convexities formed on the inner surface of the second principal portion 26b, and is emitted from the second principal portion toward the front of the vehicle. On the other hand, the lamp cover 26 is formed with a projected portion 26c on the inner surface thereof so as to face toward the second LED 27b, and the second corner section 26a is formed with concavities and convexities oriented in parallel with the vertical direction and aligned continuously in the direction of the width of the vehicle on the inner surface thereof. A part of light emitted from the second LED 27b and passed from the projected portion 26c through the inside of the lamp cover toward the outer end widthwise of the vehicle is reflected on the concavities and convexities formed on the inner surface of the second corner section 26a and is emitted from the second corner section toward the front and the side of the vehicle, and the remainder of the light is emitted from the outer end of the second corner section 26a toward the backside of the vehicle.

The first LEDs 27a as the plurality of light emitting elements 27 are mounted on the base as the support 28, and are accommodated in the lamp housing 24. The support 28 is provided with the first light reflector 29 on the surface facing toward the lamp cover 26, and the lamp housing 24 is provided at the first corner section 24a with the second light reflector 31 curved along the configuration thereof. As shown in FIG. 2 in detail, the first and second light reflectors 29, 31 in this embodiment are resin molds and fabricated by applying metal plating on the surface thereof. Two or more first LEDs 27a may be inserted into the first light reflector 29, in which a plurality of holes 29a that increase in diameter toward the lamp cover 26 are formed and light emitted from the first LED 27a toward the surroundings reflects on the metal plate applied on the inner surface of the holes 29a and is directed toward the lamp cover 26.

The cover lamp 23 is fabricated by adhering the peripheral edge of the lamp cover 26 on the peripheral edge of the lamp housing 24 including the plurality of light emitting elements 27 by the use of adhesive agent, and formed with a recessed groove 23a defined by the outer end portion of the first corner section 24a and the outer end portion of the second corner section 26a in the adhered state, which is capable of being fitted on the peripheral edge of the through hole 22b on the far side from the vehicle. On the other hand, the first principal portion 24b is formed with a flange 24c having a mounting hole 24d at the inner end portion thereof. Further, the mirror cover body 22 is formed with a boss 22c at the peripheral edge of the through hole 22b on the side closer to the vehicle, and the cover lamp 23 is mounted on the mirror cover body 22 by fitting the recessed groove 23a on to the peripheral edge of the through hole 22b on the far side from the vehicle, and in this state, passing a screw 32 through the mounting hole 24d and screwing into the boss 22c.

The side mirror cover 21 including the mirror cover body 22 and the cover lamp 23 is capable mounted on the front surface of the side mirror body 16 by being applied with a double-faced adhesive tape (not shown) on the inner surface thereof and then inserted into the mounting member 17 of the side mirror body 16 from the front. Therefore, the cover lamp 23 cannot be removed from the mirror cover body 22 unless the mirror cover body 22 is removed from the mounting member 17. The cover lamp 23 is electrically connected to the direction indicator lamps 11 of the vehicle 10 in the state of being mounted on the side mirror body 16. In other words, lead wires (not shown) connected to the plurality of light emitting elements 27 at one end thereof are disposed in the interior of the vehicle 10 and are connected lead wires that supply a power to the direction indicator lamps 11 of the vehicle 10 on the other end. Accordingly, when a power is supplied and the direction indicator lamp 11 is flickered, the lead wires are also supplied with a power, and thus the plurality of light emitting elements 27 are flickered.

With the vehicle side mirror 14 in this arrangement, when the driver of the vehicle 10 in FIG. 4 flickers the direction indicator lamp 11 before turning the vehicle, the plurality of light emitting elements 27 in the cover lamp 23 on the side mirror 14 located on the outer extremity of the vehicle 10 and connected to the direction indicator lamp 11 flicker. Light emitted from the first LEDs 27a in the plurality of light emitting elements 27 passes through the second principal portion 26b directly or after being reflected on the first light reflector 29 and refracted by the concavities and convexities formed on the inner surface of the second principal portion 26b of the lamp cover 26, and is emitted from the second principal portion toward the front of the vehicle, whereby the oncoming cars approaching from the front can recognize the turning direction of the vehicle.

Figure 5:
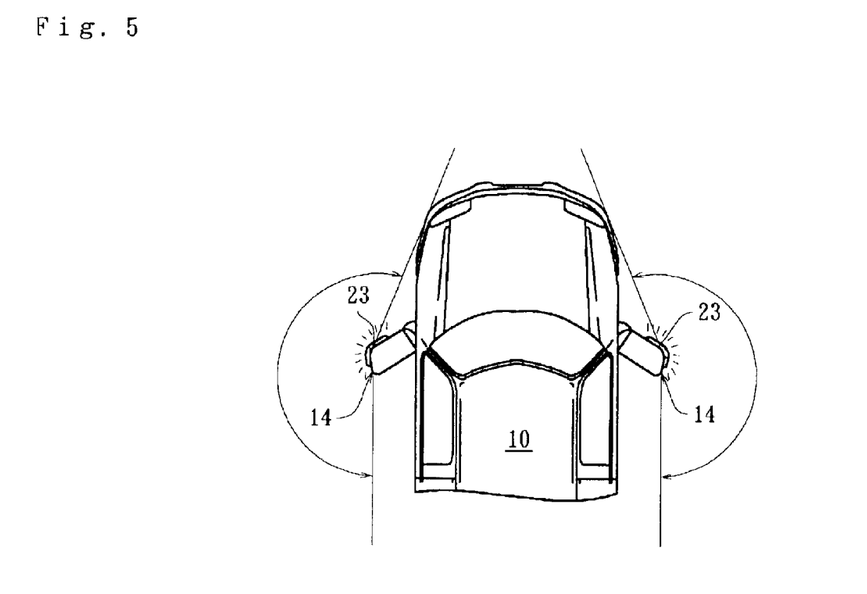
FIG. 5 is a drawing showing the range in which the lamp is visible.

On the other hand, light emitted from the second LEDs 27b in the plurality of light emitting elements 27 passes from the projected portion 26c through the inside of the lamp cover 26 toward the outer end widthwise of the vehicle, and a part of light is reflected on the concavities and convexities formed on the inner surface of the second corner section 26a and emitted from the second corner section toward the front and the side of the vehicle. As a consequent, the third parties walking on the street on the side of the vehicle or the driver in the vehicle approaching from the side toward the vehicle at an intersection can recognize the turning direction of the vehicle. Light passing through the inside of the lamp cover toward the outer end widthwise of the vehicle is finally emitted from the outer end portion of the second corner section 26a toward the backside of the vehicle, and thus the illumination shown in FIG. 5 can be recognized from the surroundings of the vehicle in relatively wide range. As a consequent, the turning direction of the vehicle can also be recognized by the third parties on the street behind the vehicle, or the driver in the vehicle approaching from behind, whereby the drivers of the vehicles and the third parties on the street can effectively avoid contact with the vehicle 10, thereby ensuring a sufficient safety.

Though the case in which the second LEDs 27b are provided in the first principal portion 24b on the far side from the vehicle has been described in the preceding embodiment, the second LEDs 27b may be provided on the side of the first principal portion 24b on the side closer to the vehicle 10, as shown in FIG. 6. In such a case, the projected portion 26c facing toward the second LEDs 27b is also formed on the inner surface of the lamp cover 26 on the side closer to the vehicle 10. Consequently, light emitted from the second LED 27b passes from the projected portion 26c through the second principal portion 26b and the second corner section 26a toward the widthwise end of the vehicle 10. Then a part of the light reflects on the concavities and convexities on the inner surface of the second corner section 26a and is emitted from the second corner section 26a toward the front and the side of the vehicle 10, while the remainder of the light is emitted from the outer end portion of the second corner section 26a toward the backside of the vehicle 10.

Though the lamp cover 26 covers the plurality of light emitting elements 27 and is adhered on the lamp housing 24 in the embodiment described above, it is also possible to mount the lamp cover 26 on the mirror cover body 22 and adhere the lamp housing to the lamp cover 26.

As is described thus far, according to the invention, the lamp housing comprises the curved first corner section for closing up mainly the part of the through hole corresponding to the widthwise end of the vehicle, and the first principal portion continuing from the first corner section for closing up the remainder of the through hole, the lamp cover comprises the second corner section facing toward the first corner section and the second principal portion continuing from the second corner section and facing toward the first principal portion, and the plurality of light emitting elements comprises one or more first LEDs provided on the first principal portion for emitting light toward the front of the vehicle and one or more second LEDs for emitting light toward the side of the vehicle. Therefore, light emitted from the first LED passes through the second principal portion in the lamp cover and is emitted toward the front of the vehicle, and light emitted from the second LEDs passes through the second corner section and is emitted toward the front and the side of the vehicle. Consequently, these lights can be recognized from the surroundings of the vehicle in relatively wide range.

In this case, since the projected portion facing toward the second LEDs is formed on the inner surface of the lamp cover, and the inner surface of the second corner section is formed with the concavities and convexities, light emitted from the second LEDs passes from the curved-out portion through the interior of the lamp cover toward the outer end widthwise of the vehicle, and a part of the light reflects on the concavities and convexities formed on the inner surface of the second corner section and is emitted from the second corner section toward the front and the side of the vehicle. Consequently, the third parties or the drivers in other vehicles on the side of the vehicle can recognize the turning direction of the vehicle. Since light passing through the inside of the lamp cover toward the widthwise outer end is finally directed from the outer end of the second corner section also toward the backside of the vehicle, the third parties or the drivers on the backside of the vehicle can recognize the light.

Since the first light reflector is provided on the support having the plurality of light emitting elements mounted thereon on the surface facing toward the lamp cover, and the curved second light reflector on the first corner section of the lamp housing, light emitted from the light emitting elements reflects toward the front of the vehicle or toward the front and the side of the vehicle owing to the presence of these light reflectors, whereby light can be effectively recognized by the third parties or the drivers in other vehicles in the surroundings of the vehicle.

In addition, since the cover lamp is formed with a recessed groove at the outer end thereof, which is capable of being fitted on the peripheral edge of the through hole on the far side from the vehicle, and formed with the flange having the mounting hole at the inner end of the first principal portion, and the mirror cover body is formed with the boss at the peripheral edge of the through hole on the side closer to the vehicle, the cover lamp can be mounted on the mirror cover body by relatively simple process of fitting the recessed groove onto the peripheral edge of the through hole on the far side from the vehicle, and in this state, passing the screw through the mounting hole and screwing it into the boss. Consequently, the cover lamp is effectively prevented from being removed from the mirror cover body.

What is claimed is:

1. A vehicle side mirror cover comprising:
   a mirror cover body for covering at least the convex surface of a side mirror body of a vehicle, said vehicle having a widthwise extremity corresponding to the width of the main body of the vehicle; wherein said mirror cover body is formed with a laterally elongated through hole extending transverse to said mirror cover body and having an outer end at the position corresponding to the said widthwise extremity of the main body of the vehicle; and
   a cover lamp adapted to fit into said through hole to substantially close said through hole;
   wherein said cover lamp comprises:
      a lamp housing mounted on said mirror cover body:
         wherein said lamp housing includes:
            a curved first corner section for substantially closing the portion of said through hole corresponding to the widthwise extremity of the main body of the vehicle; and
            a first principal portion continuing from said curved first corner section for closing the remainder of said through hole;
      a plurality of light emitting elements adapted to fit within said lamp housing; and
         wherein said plurality of light emitting elements comprise:
            one or more first LED or LEDs provided on said first principal portion for emitting light toward the front of the vehicle, said one or more first LED or LEDs being configured to pass said emitted light through said second principal portion; and
            one or more second LED or LEDs provided on said first principal portion and facing said projected portion for emitting light toward the side of the vehicle by passing through said second corner section and for emitting light from the outer end of said second corner section toward the backside of the vehicle by passing through said projected portion and said second corner section toward the outer end of the widthwise extremity of the main body of the vehicle;

a translucent lamp cover mounted on either one or both of said lamp housing and said mirror cover body for covering said plurality of light emitting elements;

wherein said translucent lamp cover includes:

a second corner section opposed to said curved first corner section;

a second principal portion continuing from said second corner section and opposed to said first principal portion; and a projected portion provided on the inner surface of said translucent lamp cover.

2. A vehicle side mirror cover according to claim 1, wherein:

said projected portion formed on the inner surface of said translucent lamp cover faces toward said one or more second LED or LEDs; and said second corner section is formed with concavities and convexities oriented in parallel with the vertical direction and aligned continuously in the direction of width of the vehicle on the inner surface thereof, so that light from said one or more first LED or LEDs passes through said second principal portion and is emitted toward the front of the vehicle, and light from said one or more second LED or LEDs passes through the said projected portion and said second corner section toward the widthwise extremity of the main body of the vehicle, reflects on the concavities and convexities on the inner surface of said second corner section, and is emitted from said second corner section toward the front and the side of the vehicle and simultaneously from the outer end of said second corner section toward the backside of the vehicle.

3. A vehicle side mirror cover according to claim 1, wherein:

said projected portion formed on the inner surface of said translucent lamp cover faces toward said one or more second LED or LEDs: and said second corner section is formed with the concavities and convexities oriented in parallel with the vertical direction and aligned continuously in the direction of width of the vehicle on the inner surface thereof, so that light from said one or more first LED or LEDs passes through said second principal portion and is emitted toward the front of the vehicle, and light from said one or more second LED or LEDs passes from said projected portion through said second principal portion and said second corner section toward the widthwise extremity of the main body of the vehicle, reflects on the concavities and convexities on the inner surface of said second corner section, and is emitted from said second corner section to the front and the side of the vehicle and simultaneously from the outer end of said second corner section toward the backside of the vehicle.

4. A vehicle side mirror cover according to claim 3, wherein:

said plurality of light emitting elements is mounted on a support and is accommodated in said lamp housing; and a first light reflector is provided on the surface of said support facing toward said translucent lamp cover.

5. A vehicle side mirror cover according to claim 3, wherein a curved second light reflector is provided on said first corner section of said lamp housing.

6. A vehicle side mirror cover according to claim 3, wherein:

said cover lamp is fabricated by adhering said peripheral edge of the translucent lamp cover to the peripheral edge of said lamp housing;

said lamp housing is formed with a recessed groove defined by the outer end portion of said first corner section and the outer end portion of said second corner section in the adhered state, which is capable of being fitted on the peripheral edge of said through hole, and is formed with a flange having a mounting hole at the inner end of said first principal portion;

said mirror cover body is formed with a boss at the peripheral edge of said through hole; and said translucent cover lamp is mounted on said mirror cover body by fitting said recessed groove onto the peripheral edge of said through hole, passing a screw through said mounting hole and screwing the same into said boss.

7. A vehicle side mirror cover according to claim 1, wherein:

said plurality of light emitting elements is mounted on a support and is accommodated in said lamp housing; and a first light reflector is provided on the surface of said support facing toward said translucent lamp cover.

8. A vehicle side mirror cover according to claim 1, wherein a curved second light reflector is provided on said first corner section of said lamp housing.

9. A vehicle side mirror cover according to claim 1, wherein:

said cover lamp is fabricated by adhering the peripheral edge of said translucent lamp cover to the peripheral edge of said lamp housing;

said lamp housing is formed with a recessed groove defined by the outer end portion of said first corner section and the outer end portion of said second corner section in the adhered state, which is capable of being fitted on the peripheral edge of said through hole, and is formed with a flange having a mounting hole formed at the inner end of said first principal portion;

said mirror cover body is formed with a boss at the peripheral edge of said through hole; and said translucent cover lamp is mounted on said mirror cover body by fitting said recessed groove onto the peripheral edge of said through hole, passing a screw through said mounting hole and screwing the same into the said boss.

10. A cover lamp to be fitted from the backside of a mirror cover body into a laterally elongated through hole wherein said through hole extends transverse to said mirror cover body;

wherein said mirror cover body is adapted for covering the convex surface of a side mirror body on a vehicle, and is formed with through hole having an outer end at the position corresponding to the widthwise extremity of the main body of the vehicle;

wherein said cover lamp comprises:

a lamp housing mounted on said mirror cover body along the peripheral edge of said through hole for substantially closing said through hole and provided with a plurality of light emitting elements; and a translucent lamp cover adhered on lamp housing for covering plurality of light emitting elements;

wherein the lamp housing includes:

a curved first corner section for substantially closing the portion of said through hole corresponding to the widthwise extremity of the main body of the vehicle; and a first principal portion continuing from said curved first corner section for closing the remainder of said through hole;

wherein said translucent lamp cover includes:

a second corner section opposed to said first corner section;

a second principal portion continuing from said second corner section and opposed to said first principal portion; and a projected portion provided on the inner surface of said translucent lame cover;

wherein said plurality of light emitting elements includes:

one or more first LED or LEDs provided on said first principal portion for emitting light toward the front of the vehicle by passing through said second principal portion; and one or more second LED or LEDs provided on said first principal portion and facing said projected portion for emitting light toward the side of the vehicle by passing through said second corner section and for emitting light from the outer end of said second corner section toward the backside of the vehicle by passing through said projected portion and said second corner section toward the outer end widthwise extremity of the main body of the vehicle.

11. A cover lamp according to claim 10, wherein:

the one or more second LED or LEDs is provided on the first principal portion on the side of said second corner section, LED; and said second corner section is formed with the concavities and convexities oriented in parallel with the vertical direction and aligned continuously in the direction of the width of the vehicle on the inner surface thereof for reflecting light from said one or more second LED or LEDs toward the front and side of the vehicle.

12. A cover lamp according to claim 10, wherein:

said one or more second LED or LEDs is provided on said first principal portion on the side opposite from said second corner section; and said second corner section is formed with the concavities and convexities oriented in parallel with the vertical direction and aligned continuously in the direction of width of the vehicle on the inner surface thereof for reflecting light from said one or more second LED or LEDs toward the front and side of the vehicle.

13. A cover lamp according to claim 12, wherein:

said plurality of light emitting elements is mounted on a support and is accommodated in said lamp housing; and a first light reflector is provided on the surface of the said support facing toward said translucent lamp cover.

14. A cover lamp according to claim 12, wherein a curved second light reflector is provided on said first corner section of said lamp housing.

15. A cover lamp according to claim 12, wherein:

said lamp housing is formed with a recessed groove, said recessed groove which is capable of being fitted on the peripheral edge of said through hole is defined by the outer end portion of said first corner section and the outer end portion of said second corner section in a state in which the peripheral edge of said lamp housing and the peripheral edge of said lamp cover are adhered; and said lamp housing is formed with a flange, said flange having a mounting hole formed at the inner end of the said first principal portion.

16. A cover lamp according to claim 10, wherein:

said plurality of light emitting elements is mounted on a support and is accommodated in said lamp housing; and a first light reflector is provided on said surface of the support facing toward the translucent lamp cover.

17. A cover lamp according to claim 10, wherein a curved second light reflector is provided on said first corner section of said lamp housing.

18. A cover lamp according to claim 10, wherein:

said lamp housing is formed with a recessed groove, said recessed groove which is capable of being fitted on the peripheral edge of said through hole is defined by the outer end portion of said first corner section and the outer end portion of said second corner section in a state in which the peripheral edge of said lamp housing and the peripheral edge of said lamp cover are adhered; and said lamp housing is formed with a flange, said flange having a mounting hole formed at the inner end of said first principal portion.

* * * * *